US012779705B2

(12) United States Patent
Kim et al.

(10) Patent No.: US 12,779,705 B2
(45) Date of Patent: Nov. 3, 2026

(54) ASSEMBLY STRUCTURE AND ROBOT INCLUDING THE SAME

(71) Applicants: HYUNDAI MOTOR COMPANY, Seoul (KR); KIA CORPORATION, Seoul (KR)

(72) Inventors: Beom Su Kim, Yongin-si (KR); Hyun Seop Lim, Anyang-si (KR); Dong Hyun Lee, Ansan-si (KR); Dong Jin Hyun, Suwon-si (KR); Ju Young Yoon, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 342 days.

(21) Appl. No.: 18/672,833

(22) Filed: May 23, 2024

(65) Prior Publication Data

US 2025/0178213 A1 Jun. 5, 2025

(30) Foreign Application Priority Data

Dec. 4, 2023 (KR) ........................ 10-2023-0173608

(51) Int. Cl.
*B25J 15/04* (2006.01)

(52) U.S. Cl.
CPC ....... *B25J 15/0433* (2013.01); *B25J 15/0408* (2013.01)

(58) Field of Classification Search
CPC .... B25J 15/04; B25J 15/0408; B25J 15/0433; B25J 9/0009; F16B 21/02; Y10T 403/7005
See application file for complete search history.

(56) References Cited

U.S. PATENT DOCUMENTS 10,047,908 B1 * 8/2018 Bohle .................. B25J 15/0466
10,086,424 B2 * 10/2018 Carruthers ............. B21D 37/04
(Continued)

FOREIGN PATENT DOCUMENTS

DE 102005028573 A1 * 12/2006 .............. F16B 21/02
DE 102016117751 A1 * 3/2018 ............. A61B 90/50
(Continued)

OTHER PUBLICATIONS

Franka Robotics Gmbh, Product Manual Franka Hand, Document No. R50010; Feb. 2024; 36 pp.
Onrobot, Faster Deployment of Robotic End of Arm Tools with Quick Changer, https://onrobot.com/us/node/1637; 2019; 3 pp.
(Continued)

*Primary Examiner* — Jonathan P Masinick
(74) *Attorney, Agent, or Firm* — Lempia Summerfield Katz LLC

(57) ABSTRACT

An assembly structure, such as for connecting a robot arm and a gripper or other such components, includes an assembling part and a coupling part provided above the assembling part. The assembling part includes a body and a flange fixedly coupled to an upper portion of the body. The coupling part includes a base member and a sleeve member configured to surround a periphery of the base member. The flange is configured such that a rotational motion of the flange about a rotation center axis relative to the base member is restricted. The sleeve member is configured to be rotatable relative to the base member and the sleeve member and the flange are configured to interfere with each other in an upward/downward direction.

18 Claims, 12 Drawing Sheets

(56) References Cited

U.S. PATENT DOCUMENTS

| | | | | |
|---|---|---|---|---|
| 10,259,127 | B2 * | 4/2019 | Bellandi | B25J 19/0033 |
| 10,286,566 | B2 * | 5/2019 | Williams | B25J 19/0033 |
| 10,791,825 | B2 | 10/2020 | Pringle-iv et al. | |
| 11,154,993 | B2 | 10/2021 | Geary | |
| 11,192,243 | B2 * | 12/2021 | Nilsson | B25J 15/0019 |
| 11,254,013 | B2 | 2/2022 | Safeldt | |
| 11,278,110 | B2 | 3/2022 | Pringle-iv | |
| 11,485,010 | B2 * | 11/2022 | Zimmer | B25J 9/08 |
| 11,975,445 | B2 * | 5/2024 | Klein | A61B 34/30 |
| 2019/0191861 | A1 | 6/2019 | Pringle-iv | |
| 2020/0383464 | A1 | 12/2020 | Pringle-iv | |
| 2021/0178608 | A1 | 6/2021 | Geary | |
| 2021/0402619 | A1 | 12/2021 | Geary | |
| 2025/0303583 | A1 * | 10/2025 | Kim | B25J 15/0425 |

FOREIGN PATENT DOCUMENTS

| | | | | | |
|---|---|---|---|---|---|
| DE | 102017001943 | A1 * | 8/2018 | F16L 39/00 |
| EP | 0154227 | A1 * | 9/1985 | B23Q 9/0064 |
| EP | 1123784 | A2 * | 8/2001 | B25J 15/04 |
| EP | 3838511 | A1 | 6/2021 | |
| JP | 7194005 | B2 | 12/2022 | |
| KR | 101178115 | B1 * | 8/2012 | E04G 17/065 |
| KR | 20220147423 | A * | 11/2022 | B25J 15/0061 |
| WO | WO-2019142709 | A1 * | 7/2019 | B25J 15/04 |

OTHER PUBLICATIONS

Robotiq Inc., Robotiq 2F-85 & 2F-140 Instruction Manual, 2021; 152 pp.

* cited by examiner

ASSEMBLY STRUCTURE AND ROBOT INCLUDING THE SAME

CROSS-REFERENCE TO RELATED APPLICATION

This application claims priority to and the benefit of Korean Patent Application No. 10-2023-0173608 filed in the Korean Intellectual Property Office on Dec. 4, 2023, the entire contents of which are incorporated herein by reference.

TECHNICAL FIELD

The present disclosure relates to an assembly structure and a robot including the same, and more particularly, to an assembly structure and a robot including the same, which are capable of easily coupling and uncoupling a robot arm and a gripper configured to be coupled to an end of the robot arm.

BACKGROUND ART

Methods of coupling a gripper, which performs a gripping function, to a robot arm provided on a robot are broadly classified into i) a first method of assembling the gripper directly to the robot arm by using a bolt member or the like and ii) a second method of using a separate component configured to connect the gripper and the robot arm. Among the methods, the first method (i) is performed by separating the gripper, which is intended to be replaced, from the robot arm by loosening a member such as a bolt, bringing another gripper into close contact with the robot arm, and then fastening the bolt. In addition, the second method (ii) is performed by connecting the gripper and the robot arm by using a quick-changer-type coupling member.

However, in the related art, the first method (i) has a problem in that a large amount of time is required to detach and reattach the gripper, and the first method is inconvenient to use. In addition, the second method (ii) has a problem in that the type of connector, which may be adopted to electrically connect the gripper and the robot arm, is limited in accordance with a structure and operational principle of the coupling member. For example, a method of coupling the gripper and the robot arm by rotating the coupling member has a problem in that a plug-socket type connector structure cannot be applied.

SUMMARY

The present disclosure has been made in an effort to provide a structure for connecting a robot arm and a gripper. The structure is capable of adopting various types of connector structures that can be easily mounted and detached in comparison with the related art.

In order to achieve the above-mentioned objects, one aspect of the present disclosure provides an assembly structure including an assembling part and a coupling part. The coupling part is provided above the assembling part and configured to be attachable to or detachable from the assembling part. The assembling part includes a body configured to define a body of the assembling part and open at an upper side thereof and includes a flange fixedly coupled to an upper portion of the body. The coupling part includes a base member and a sleeve member. The sleeve member is configured to surround a periphery of the base member and open at a lower side thereof. The flange is configured to penetrate the sleeve member and face the base member. A rotational motion of the flange about a rotation center axis AX of the assembly structure relative to the base member is restricted. The sleeve member is configured to be rotatable relative to the base member. The sleeve member and the flange are configured to interfere with each other in an upward/downward direction H when a rotation angle of the sleeve member with respect to the base member is within a predetermined range.

The coupling part may further include a pin member protruding downward from a lower surface of the base member. A pin insertion groove may be defined in an upper surface of the flange and have a shape that is recessed downward. The pin member may be inserted into the pin insertion groove.

The base member may include a base flange to which the pin member is coupled and may include a base protruding portion protruding upward from the base flange. An interference region may be defined on an outer peripheral surface of the base protruding portion and have a shape that is protruding outward. The sleeve member may include an upper sleeve configured to define an upper region of the sleeve member and surround the outer peripheral surface of the base protruding portion. The upper sleeve may have a rotation interference groove defined in an inner peripheral surface of the upper sleeve and configured to accommodate the interference region. The interference region may be configured to interfere with the upper sleeve at a boundary of the rotation interference groove based on a circumferential direction A.

A recessed region may be defined in the outer peripheral surface of the base protruding portion and may be spaced apart from the interference region in the circumferential direction A. The recessed region may have a shape that is recessed inward. The coupling part may further include a latch member that is rotatably coupled to the upper sleeve and having at least a partial region configured to be inserted into the recessed region in a state in which the sleeve member is coupled to the base member so that the interference region is placed in the rotation interference groove.

The latch member may include an insertion region having a shape protruding toward the rotation center axis AX so as to be inserted into the recessed region. The insertion region may face the recessed region in a state in which the sleeve member is rotated relative to the base member so that the interference region is provided adjacent to a boundary of one side of the rotation interference groove based on the circumferential direction A.

The upper sleeve may have a latch accommodation groove that is configured to accommodate the latch member and having a shape recessed in the upward/downward direction H. A latch rotation shaft may penetrate the latch member in the upward/downward direction H. The coupling part may further include an elastic member configured to face the insertion region with the latch rotation shaft interposed therebetween. The elastic member may be provided between the latch member and the outer peripheral surface of the base protruding portion.

An outer surface of a region of the latch member, which faces the elastic member, may be exposed to the outside.

The sleeve member may further include a lower sleeve provided below the upper sleeve, configured to surround an outer peripheral surface of the base flange, and fixedly coupled to the upper sleeve. The lower sleeve may have a flange insertion region that is defined in a part of an inner peripheral surface of the lower sleeve and having a shape that is recessed outward. The flange may have a flange projection region protruding outward from the outer peripheral surface of the flange. A width of the flange insertion region in the circumferential direction A of the assembly structure may be larger than a width of the flange projection region in the circumferential direction A or may correspond to the width of the flange projection region.

When the assembly structure is viewed from above the assembly structure, the entire flange projection region may be accommodated in the flange insertion region in a state in which the sleeve member is rotated relative to the base member so that the interference region is provided adjacent to a boundary of the other side of the rotation interference groove based on the circumferential direction A.

The coupling part may include a sliding member accommodated in the upper sleeve and may include a bolt member configured to be inserted into an outer peripheral surface of the upper sleeve and the sliding member. A sliding member coupling groove may be defined in a peripheral region of the upper sleeve. The sliding member coupling groove may have a recessed shape and may define a space that accommodates the sliding member.

A size in the upward/downward direction H of a hole defined in a region of the upper sleeve into which the bolt member is inserted may be larger than a size in the upward/downward direction H of a region of the bolt member inserted into the upper sleeve. A size in the upward/downward direction H of a hole defined in a region of the sliding member into which the bolt member is inserted may correspond to a size in the upward/downward direction H of a region of the bolt member inserted into the sliding member.

An upper surface of the sliding member may include a shape of an inclined surface having a height, in the upward/downward direction H, that decreases in a direction away from the rotation center axis AX. A region of the sliding member coupling groove, which faces the upper surface of the sliding member, may include a shape corresponding to the inclined surface defined on the upper surface of the sliding member.

A lower surface of the sliding member may be provided to be in close contact with an upper surface of the base flange. The lower surface of the sliding member may be perpendicular to the rotation center axis AX.

A lower surface of the sliding member may include a shape of an inclined surface having a height, in the upward/downward direction H, that increases in a direction away from the rotation center axis AX. The lower surface of the sliding member may be provided to be in close contact with an upper surface of the base flange. A region of the upper surface of the base flange, which faces the lower surface of the sliding member, may include a shape corresponding to the inclined surface defined on the lower surface of the sliding member.

An upper surface of the sliding member may be provided to be in close contact with the sliding member coupling groove. The upper surface of the sliding member may be perpendicular to the rotation center axis AX.

The coupling part may further include a connector cover accommodated in a lower surface of the base flange and may include a coupling part connector provided between the connector cover and a region of a lower surface of the base flange that accommodates the connector cover.

The assembling part may further include an assembling part connector accommodated in an internal space of the assembling part. The assembling part connector may penetrate the connector cover and may be inserted and coupled into the coupling part connector.

Another aspect of the present disclosure provides a robot including the assembly structure. The coupling part is coupled to a robot arm provided on the robot and the assembling part is coupled to a gripper coupled to one side of the robot arm and configured to perform a gripping function.

The present disclosure may provide the structure for connecting the robot arm and the gripper. The structure is capable of adopting various types of connector structures that can be easily mounted and detached in comparison with the related art.

DETAILED DESCRIPTION

Hereinafter, a robot and an assembly structure according to the present disclosure are described with reference to the drawings. When a component, device, element, or the like of the present disclosure is described as having a purpose or performing an operation, function, or the like, the component, device, or element should be considered herein as being "configured to" meet that purpose or perform that operation or function.

Robot and Assembly Structure

Figure 1:
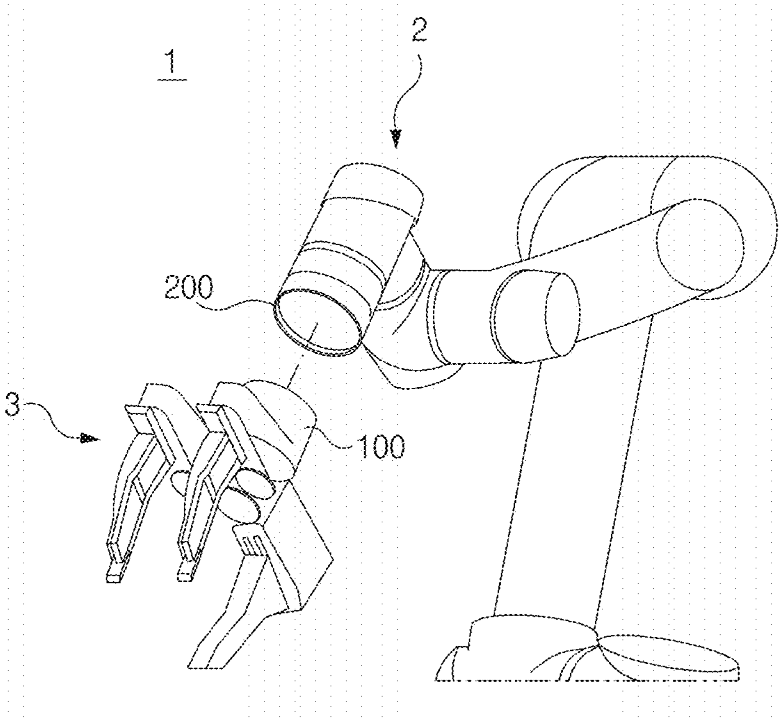
FIG. 1 is a view illustrating a structure of a robot according to the present disclosure.

FIG. 1 is a view illustrating a structure of a robot according to the present disclosure.

With reference to FIG. 1, a robot 1 according to the present disclosure may include a robot arm 2 and a gripper 3 configured to be coupled to the robot arm 2. In other words, the gripper 3 may be configured to be coupled to one side of the robot arm 2 and perform a gripping function for gripping an object.

Meanwhile, the robot 1 according to the present disclosure may include an assembly structure 10 capable of attaching and detaching the robot arm 2 and the gripper 3. In particular, as described below, according to the present disclosure, the assembly structure 10 may more easily detach and attach the robot arm 2 and the gripper 3 and prevent the robot arm 2 and the gripper 3 from being unintentionally uncoupled by an external force. Hereinafter, the structure of the assembly structure 10 is described in detail with reference to the drawings. However, the assembly structure 10 according to the present disclosure may not only be applied to attach and detach the robot arm and the gripper, but also be applied, in the same way, to a structure for coupling two components required to be repeatedly attached and detached.

Figure 2:
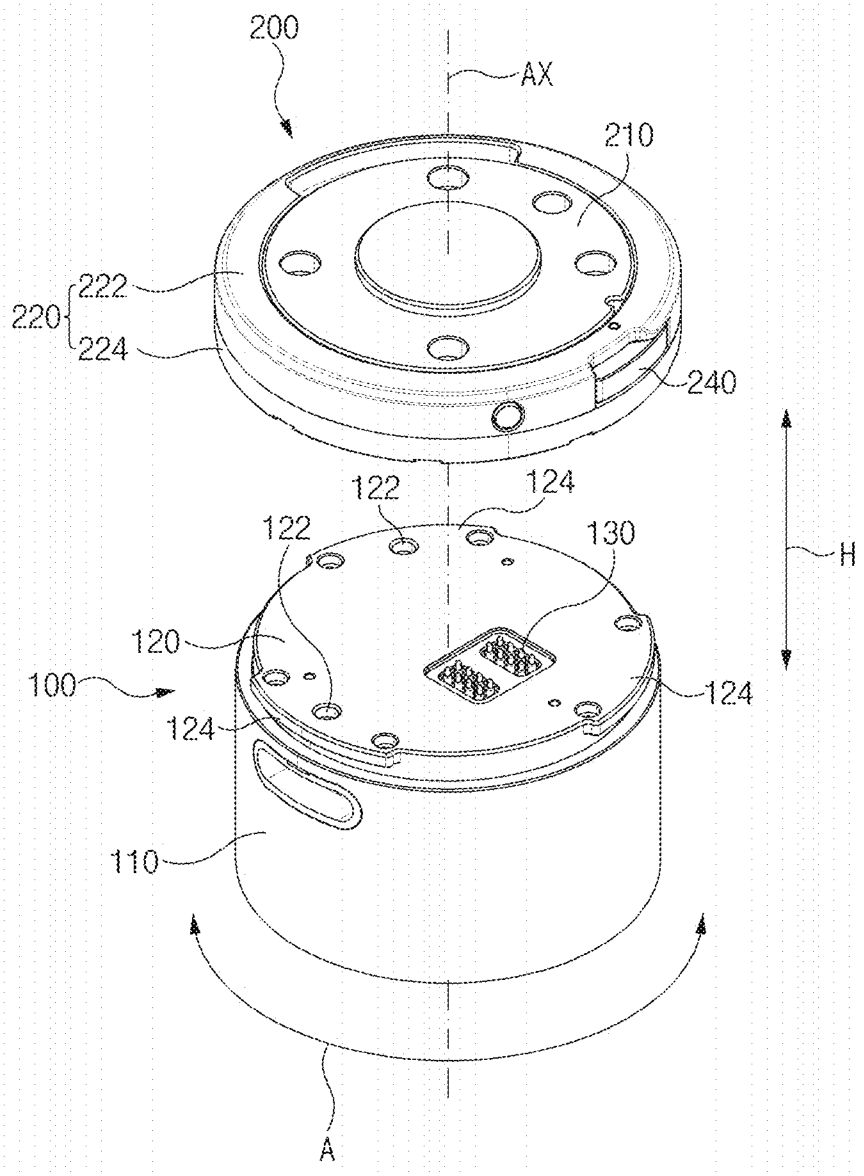
FIG. 2 is an upper perspective view illustrating assembling part and a coupling part of an assembly structure according to the present disclosure before the parts are coupled to one another.
Figure 3:
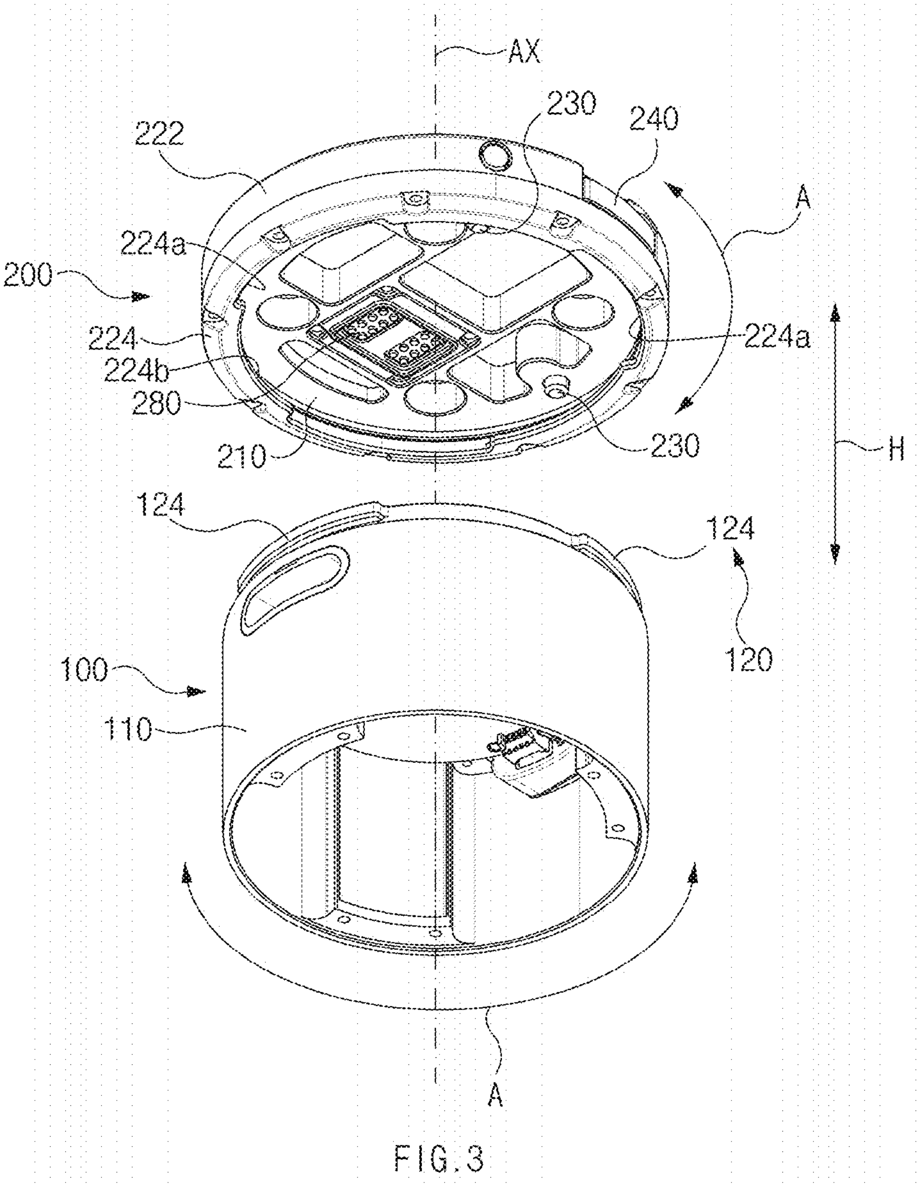
FIG. 3 is a lower perspective view illustrating the assembling part and the coupling part of the assembly structure of FIG. 2 according to the present disclosure.

FIG. 2 is a view illustrating a state before an assembling part and a coupling part of the assembly structure according to the present disclosure are coupled to one another when viewed from above. FIG. 3 is a view illustrating a state before the assembling part and the coupling part of the assembly structure according to the present disclosure are coupled to one another when viewed from below. Further, FIG. 4 is an exploded perspective view of the assembly structure according to the present disclosure.

Figure 4:
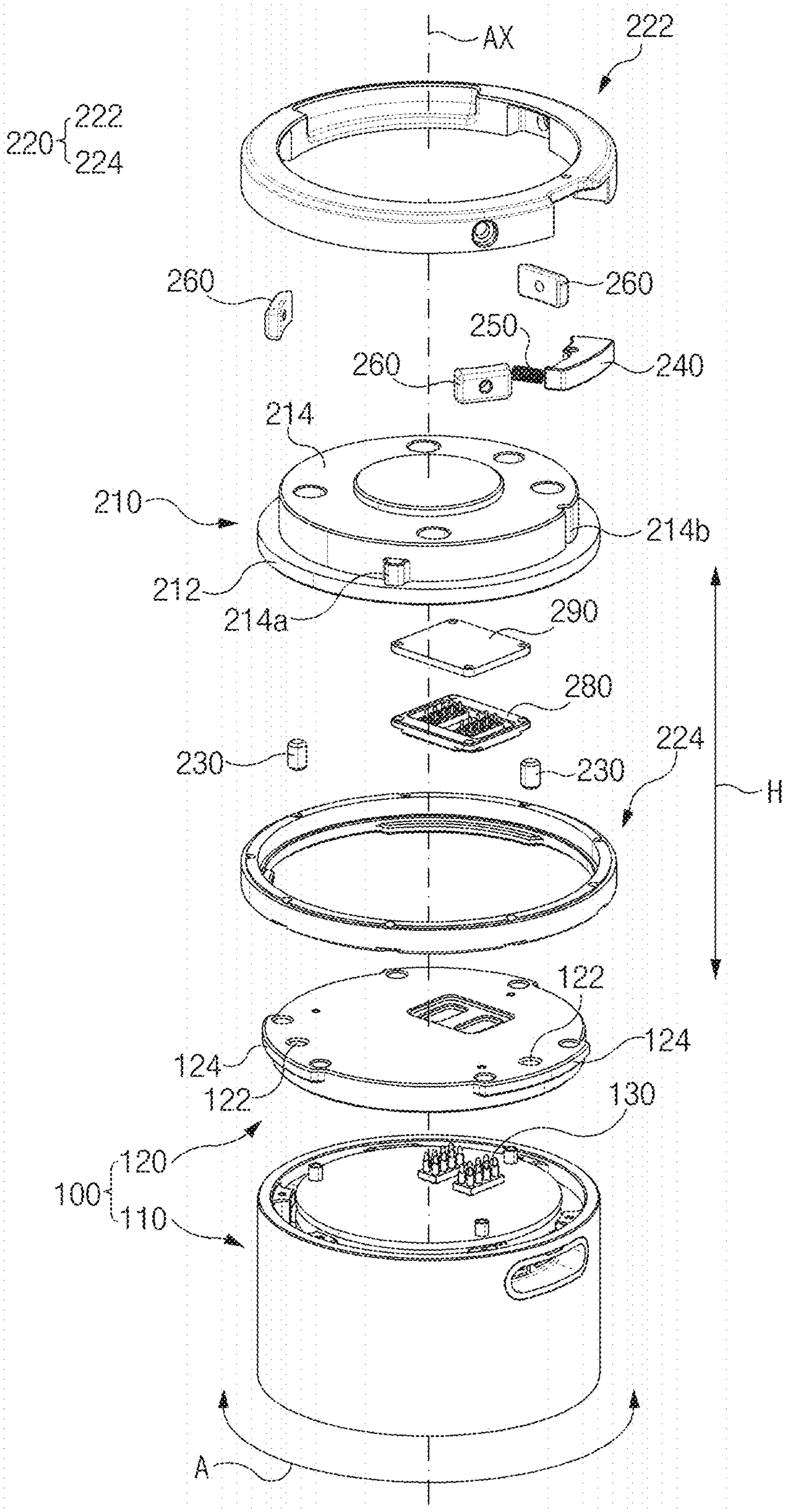
FIG. 4 is an exploded perspective view of an assembly structure according to the present disclosure.

With reference to FIGS. 2-4, the assembly structure 10 according to the present disclosure may include an assembling part 100 and a coupling part 200. The coupling part 200 may be provided above the assembling part 100 and configured to be attached to and detached from the assembling part 100. For example, in a case that the assembly structure 10 is applied to the robot, the assembling part 100 may be coupled to the gripper coupled to one side of the robot arm and configured to perform the gripping function. The coupling part 200 may be coupled to the robot arm provided on the robot. Therefore, the robot arm and the gripper may be assembled to each other by coupling the assembling part 100 and the coupling part 200 of the assembly structure 10. On the contrary, the robot arm and the gripper may be separated from each other by uncoupling the assembling part 100 and the coupling part 200.

With reference to FIGS. 2-4, the assembling part 100 may include a body 110 configured to define a body of the assembling part 100, having a space therein, and open at an upper side thereof, and may include a flange 120 coupled to an upper portion of the body 110. For example, the flange 120 may be fixedly coupled to the body 110.

The coupling part 200 may include a base member 210 and a sleeve member 220. The sleeve member 220 may be provided to surround a periphery of the base member 210 and open at a lower side thereof. As described below, according to the present disclosure, during a process of coupling the assembling part 100 and the coupling part 200, a part of the assembling part 100 may be inserted into the coupling part 200 through a space opened at the lower side of the sleeve member 220. Hereinafter, for convenience of description, the description is focused on a case in which the coupling part 200 is provided in a lower region of the assembling part 100. However, during an actual process of using the assembly structure 10, a configuration may be used, as necessary, in which the coupling part 200 is provided in an upper region of the assembling part 100, or in which the assembling part 100 and the coupling part 200 are matched with each other in a horizontal direction.

With reference to FIGS. 2-4, the flange 120 may penetrate the sleeve member 220 and face the base member 210 in an upward/downward direction H of the assembly structure 10. According to the present disclosure, the sleeve member 220 may be configured to be rotatable relative to a base flange 212 and the assembling part 100. In the present specification, during relative rotations between the sleeve member 220 and the base flange 212 and between the sleeve member 220 and the assembling part 100, a center of a rotational motion is referred to as a rotation center axis AX of the assembly structure 10. In a case that the assembling part 100 and the coupling part 200 are disposed in parallel with the upward/downward direction H, the rotation center axis AX may also be defined to be parallel to the upward/downward direction H.

In contrast, in a state in which the assembling part 100 and the coupling part 200 are completely coupled, the assembling part 100 and the base member 210 may be coupled so that the assembling part 100 and the base member 210 cannot rotate relative to each other. In other words, according to the present disclosure, the flange 120 may penetrate the sleeve member 220 and face a lower surface of the base member 210. Also, a rotational motion of the flange 120 may be restricted about the rotation center axis AX of the assembly structure 10 relative to the base member 210.

With reference to FIGS. 2-4, in order to satisfy the condition in which the rotational motion is restricted, the coupling part 200 may further include pin members 230 coupled to the lower surface of the base member 210 and protruding downward from the lower surface of the base member 210. For example, a recessed region may be defined in the lower surface of the base member 210 and may have a shape corresponding to a size of the pin member 230. The pin member 230 may be inserted into the recessed region defined in the lower surface of the base member 210. At least a partial region of the pin member 230 may protrude downward from the base member 210.

Meanwhile, a pin insertion groove 122 may be defined in an upper surface of the flange 120 and may have a shape that is recessed downward. The pin member 230 may be inserted into the pin insertion groove 122. The size and shape of the pin insertion groove 122 may correspond to the size and shape of the pin member 230. Therefore, a region of the pin member 230, which protrudes downward from the base member 210, may be inserted into the pin insertion groove 122. The rotational motion between the base member 210 and the flange 120 may be restricted by interference between the pin member 230 and the flange 120 and by interference between the pin member 230 and the base member 210. For example, FIGS. 3 and 4 illustrate that the pin members 230 are provided as two pin members 230.

Figure 5:
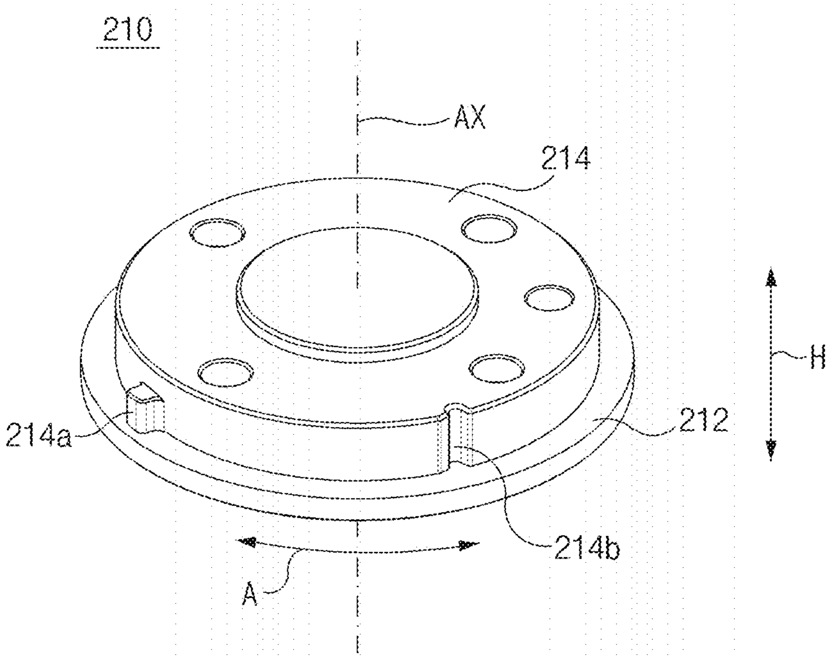
FIG. 5 is an enlarged view of a base member of a coupling part provided in an assembly structure according to the present disclosure.

FIG. 5 is an enlarged view of the base member of the coupling part provided in the assembly structure according to the present disclosure.

With reference to FIG. 5, the base member 210 may be divided into a plurality of regions in the upward/downward direction H. For example, the base member 210 may include the base flange 212 having the lower surface to which the pin member 230 (see FIG. 3 and the like) is coupled and may include a base protruding portion 214 protruding upward from the base flange 212. The base flange 212 and the base protruding portion 214 may be distinguished by a relative difference in diameter. In other words, as illustrated in FIG. 5, the base flange 212 and the base protruding portion 214 may each have an approximately circular plate shape. In this case, a diameter of the base flange 212 may be larger than a diameter of the base protruding portion 214. However, the configuration in which the base flange 212 and the base protruding portion 214 each have an approximately circular plate does not mean that the two components have perfectly circular plate shapes. It may be interpreted that the two components have bodies with approximately circular plate shapes when glancing at the two components. Rather, as described below, in an embodiment of the present disclosure, it is noted that the base protruding portion 214 has an approximately circular plate shape even though components, which protrude outward, and components, which are recessed inward, are additionally provided on an outer peripheral surface of the base protruding portion 214 or the like. Meanwhile, in the present specification, a peripheral surface of any component may be understood as a surface, among surfaces of the component, defined in a direction intersecting (more particularly, perpendicularly intersecting) a radial direction perpendicular to the rotation center axis AX of the assembly structure 10, except for upper and lower surfaces of the component. In addition, a direction in which a peripheral surface of any component extends may be defined as a circumferential direction A of the assembly structure 10.

With continued reference to FIG. 5, an interference region 214*a* may be defined on the outer peripheral surface of the base protruding portion 214 and may have a shape protruding outward in the radial direction. The interference region 214*a* may be configured to limit the rotational motion of the sleeve member 220 to a predetermined rotation angle range by interfering with the sleeve member 220 in a case that the sleeve member 220 is about to deviate from the predetermined rotation angle range and rotate relative to the base protruding portion 214. Hereinafter, a detailed shape of the sleeve member 220 will be described.

Figure 6:
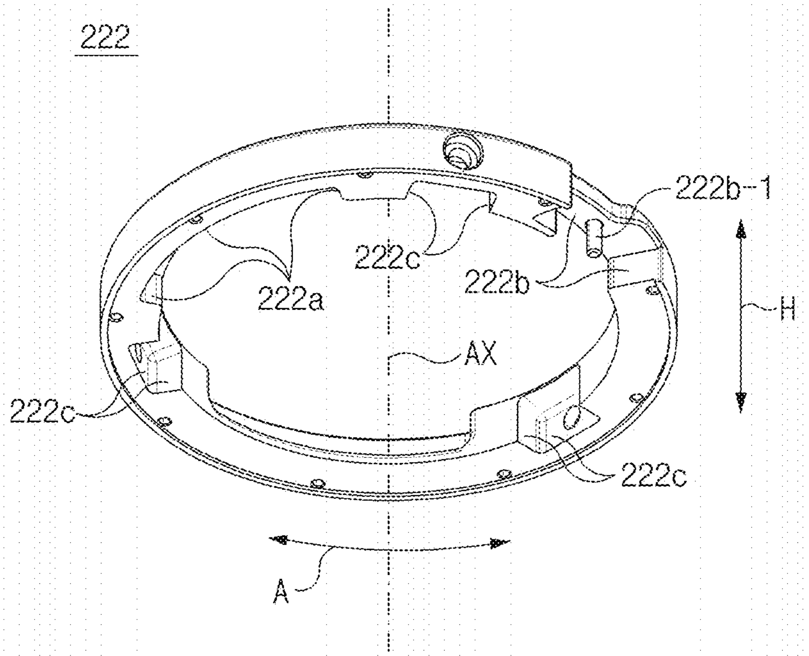
FIG. 6 is an enlarged view of an upper sleeve of a coupling part provided in an assembly structure according to the present disclosure.
Figure 7:
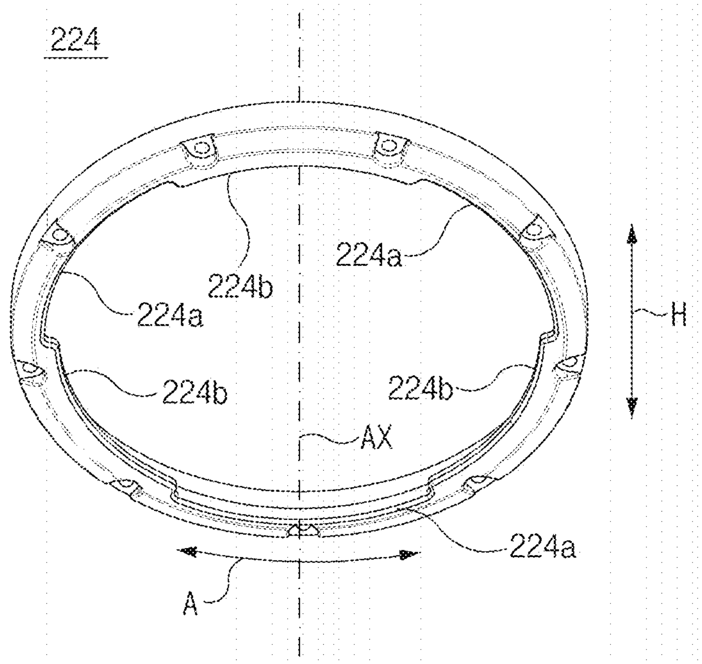
FIG. 7 is an enlarged view of a lower sleeve of a coupling part provided in an assembly structure according to the present disclosure.

FIG. 6 is an enlarged view of an upper sleeve of the coupling part provided in the assembly structure according to the present disclosure. FIG. 7 is an enlarged view of a lower sleeve of the coupling part provided in the assembly structure according to the present disclosure.

As illustrated in FIGS. 4, 6, and 7, the sleeve member 220 may be divided into a plurality of components. That is to say, the sleeve member 220 may include an upper sleeve 222 configured to define an upper region of the sleeve member 220 and to surround an outer peripheral surface of the base protruding portion 214. The sleeve member 220 may also include a lower sleeve 224 provided below the upper sleeve 222, configured to surround the outer peripheral surface of the base flange 212, and fixedly coupled to the upper sleeve 222. For example, the upper sleeve 222 and the lower sleeve 224 may be fixedly coupled to each other by bolting.

The upper sleeve 222 may have a rotation interference groove 222*a*. The rotation interference groove 222*a* may be defined in an inner peripheral surface of the upper sleeve 222 that is a surface facing the base protruding portion 214. The interference region 214*a* of the base protruding portion 214 may be accommodated in the rotation interference groove 222*a*. The relative rotational motion of the base member 210 relative to the sleeve member 220 may be performed within a range in which the interference region 214*a* and the rotation interference groove 222*a* do not interfere with each other. In other words, the interference region 214*a* and the rotation interference groove 222*a* may be configured to allow the sleeve member 220 including the upper sleeve 222 to perform the relative rotational motion within the predetermined rotation angle range without rotating 360 degrees relative to the base member 210. More specifically, the interference region 214*a* may be provided to interfere with the upper sleeve 222 at a boundary of the rotation interference groove 222*a* based on the circumferential direction A. That is to say, in a case that the interference region 214*a* is about to move in a direction that deviates from the boundary of the rotation interference groove 222*a* based on the circumferential direction A, the interference region 214*a* interferes with an inner surface defined at one side end of the rotation interference groove 222*a* based on the circumferential direction A. Thus, the relative rotational motion between the sleeve member 220 and the base member 210 is not performed any further.

With reference to FIGS. 2, 3, and 5, a recessed region 214*b* may be defined in the outer peripheral surface of the base protruding portion 214 of the assembly structure 10 according to the present disclosure. The recessed region 214*b* may be provided to be spaced apart from the interference region 214*a* in the circumferential direction A and may have a shape that is recessed inward. In addition, the coupling part 200 may further include a latch member 240 that is rotatably coupled to the upper sleeve 222. In a state in which the sleeve member 220 is coupled to the base member 210 so that the interference region 214*a* is placed in the rotation interference groove 222*a*, at least a partial region of the latch member 240 may be inserted into the recessed region 214*b*. The latch member 240 may be configured to be inserted into the recessed region 214*b* when the sleeve member 220 is placed at a predetermined rotated position relative to the base member 210. This, interference between the latch member 240 and the recessed region 214*b* may prevent the sleeve member 220 from rotating any further relative to the base member 210. In other words, the latch member 240 may be configured to be inserted into the recessed region 214*b* to fixedly couple the sleeve member 220 and the base member 210 as long as the interference between the rotation interference groove 222*a* and the interference region 214*a* may restrict the range in which the relative rotation is allowed between the sleeve member 220 and the base member 210. Further, when the latch member 240 is inserted into the recessed region 214*b*, the assembling part 100 and the coupling part 200 are fixedly coupled to each other.

For example, the latch member 240 may include an insertion region 240*a* having a shape that protrudes toward the rotation center axis AX so as to be inserted into the recessed region 214*b*. The insertion region 240*a* may have a size and shape corresponding to the recessed region 214*b*.

With reference to FIGS. 5 and 6, the upper sleeve 222 may have a latch accommodation groove 222*b* that is configured to accommodate the latch member 240 and that has a shape recessed in the upward/downward direction H. That is to say, the latch accommodation groove 222*b* may be configured to define an internal space for accommodating the latch member 240. For example, FIG. 6 illustrates a state in which the latch accommodation groove 222*b* has a shape that is open downward. Meanwhile, the latch accommodation groove 222*b* may have a latch rotation shaft 222*b*-1 configured to penetrate the latch member 240. The latch rotation shaft 222*b*-1 may serve as a rotation center axis of the latch member 240. For example, FIG. 6 illustrates a state in which the latch rotation shaft 222*b*-1 protrudes downward from an upper surface of the latch accommodation groove 222*b*.

Figure 8:
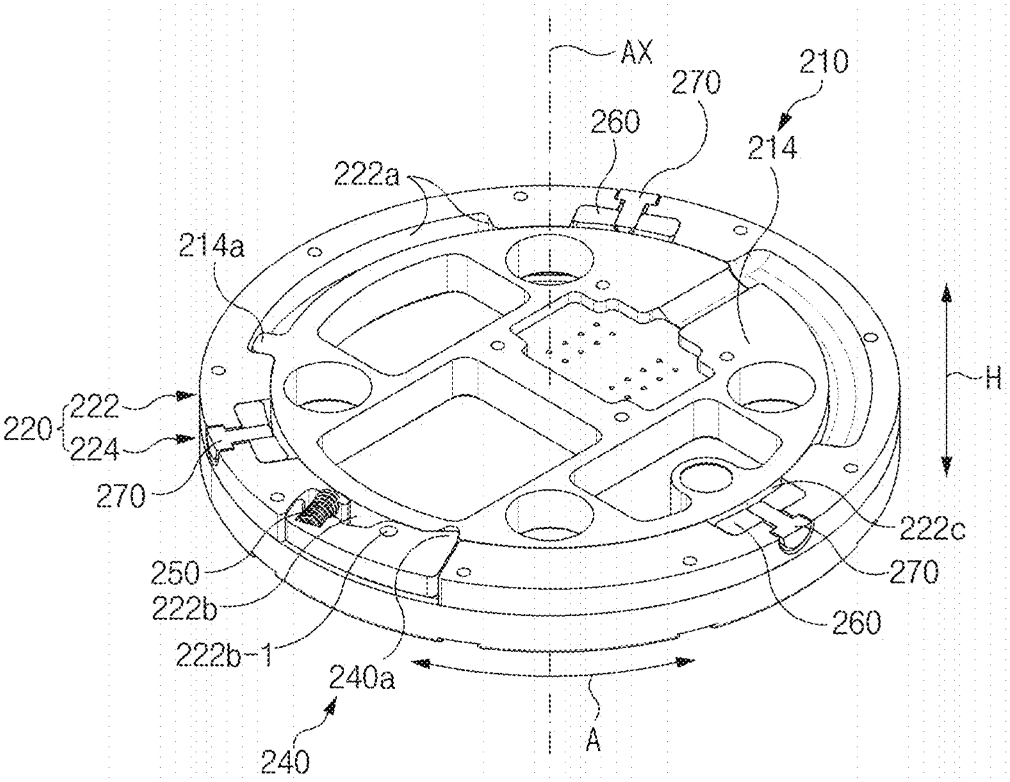
FIG. 8 is a view illustrating a horizontal cross-section of a coupling part according to the present disclosure and illustrating a state in which a sleeve member is fixedly coupled to a base member by a latch member.
Figure 9:
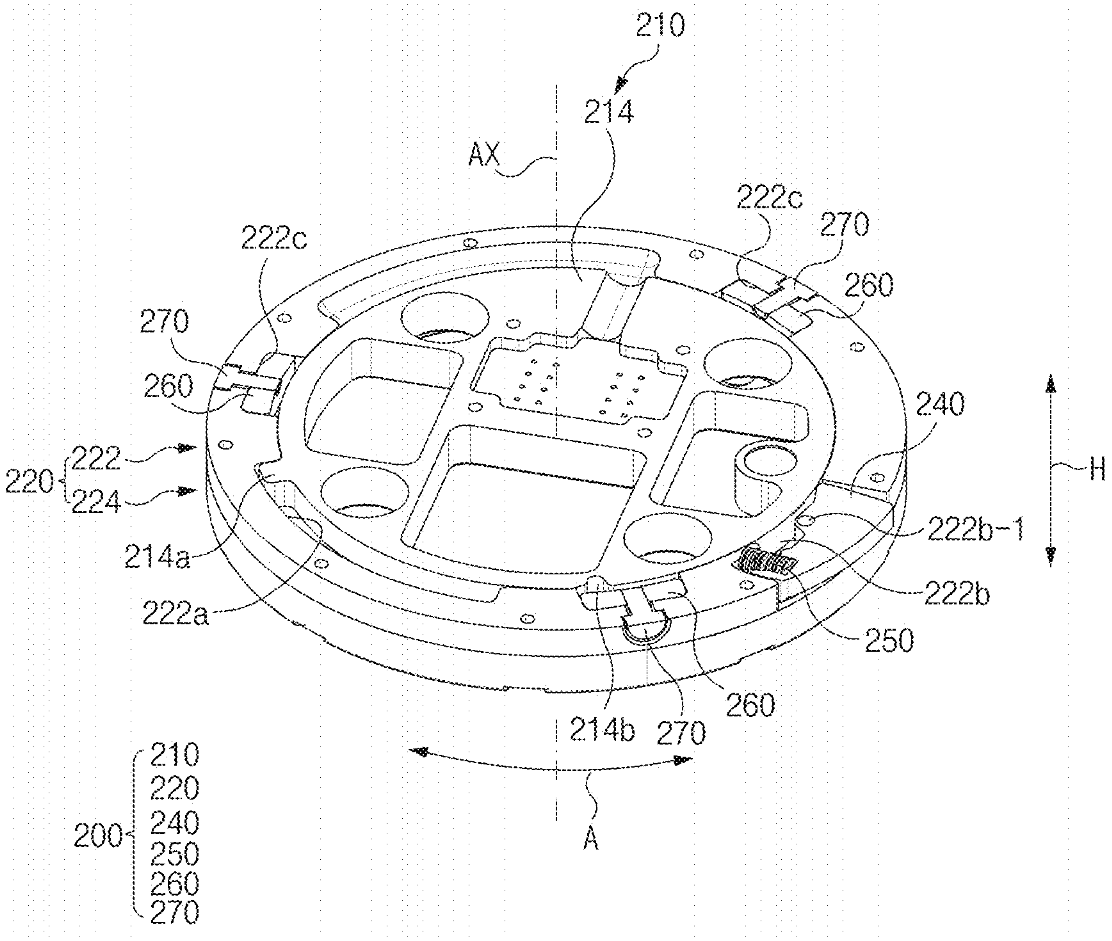
FIG. 9 is a view illustrating a horizontal cross-section of the coupling part of FIG. 8 according to the present disclosure and illustrating a state in which the sleeve member and the base member are uncoupled.

FIG. 8 is a view illustrating a structure, via a horizontal cross-section, of the coupling part according to the present disclosure and illustrating a state in which the sleeve member is fixedly coupled to the base member by the latch member. FIG. 9 is a view illustrating the structure, via the horizontal cross-section, of the coupling part according to the present disclosure and illustrating a state in which the sleeve member and the base member are uncoupled.

The assembly structure 10 according to the present disclosure may further include a configuration that provides a force to allow the latch member 240 to press the recessed region 214*b*. Thus, the state in which the latch member 240 is inserted into the recessed region 214*b* may be maintained, even after the latch member 240 is inserted into the recessed region 214*b*. More specifically, the coupling part 200 may further include an elastic member 250. The elastic member 250 is provided to face the insertion region 240*a* of the latch member 240 with the latch rotation shaft 222*b*-1 interposed therebetween. The elastic member 250 is provided between the latch member 240 and the outer peripheral surface of the base protruding portion 214. The elastic member 250 may be configured to press the latch member 240 in a direction (i.e., the radial direction) away from the rotation center axis AX. Therefore, the insertion region 240*a* of the latch member 240 may press the recessed region 214*b* by means of the force applied by the elastic member 250 to press the latch member 240. The insertion region 240*a* of the latch member 240 is thereby prevented from separating from the recessed region 214*b*.

According to an example of the present disclosure, a user may manipulate the latch member 240 in a direction away from the insertion region 240*a*. In other words, when the user presses the region of the latch member 240 that faces the insertion region 240*a* with the latch rotation shaft 222*b*-1 interposed therebetween, the insertion region 240*a* may move in the direction away from the recessed region 214*b* while overcoming a restoring force of the elastic member 250. In this case, as illustrated in FIGS. 8 and 9, an outer surface of the region of the latch member 240, which faces the elastic member 250, may be exposed to the outside so that the user may easily manipulate the latch member 240. This may be understood as a configuration in which the accommodation space for the latch member 240, which is defined by the latch accommodation groove 222*b*, is open in the direction (i.e., radial direction) away from the rotation center axis AX. In this case, because the user may press the region of the latch member 240, which is exposed to the outside, toward the rotation center axis AX as if the user pushes a button, it is possible to easily adjust a degree to which the insertion region 240*a* and the recessed region 214*b* are spaced apart from each other. Thus, it is possible to easily uncouple the assembling part 100 and the coupling part 200.

With reference back to FIG. 7, the lower sleeve 224 may have flange insertion regions 224*a* defined in a part of an inner peripheral surface of the lower sleeve 224 and each may have a shape that is recessed outward, i.e., in the direction away from the rotation center axis AX. In addition, with reference to FIGS. 2-4, the flange 120 may have flange projection regions 124 protruding outward from the outer peripheral surface of the flange 120, i.e., protruding in the direction away from the rotation center axis AX. In this case, according to the present disclosure, a width of the flange insertion region 224*a* in the circumferential direction A of the assembly structure 10 may be larger than a width of the flange projection region 124 in the circumferential direction A or may correspond to the width of the flange projection region 124. More particularly, the width of the flange insertion region 224*a* in the circumferential direction A may be slightly larger than or substantially equal to the width of the flange projection region 124 in the circumferential direction A. This is to allow the flange projection region 124 to pass through the flange insertion region 224*a*, i.e., to allow the flange 120 to pass through the lower sleeve 224 only in a case in which the flange projection region 124 is placed at a predetermined rotated position relative to the lower sleeve 224.

According to the present disclosure, during a process in which the assembling part 100 moves upward from the lower region of the coupling part 200 during the process of coupling the assembling part 100 and the coupling part 200, the flange projection region 124 may pass through a space, which is defined by the flange insertion region 224*a*. Then the flange 120 may come into close contact with a lower surface of the base flange 212. More particularly, in a case that the pin members 230 are provided as a plurality of pin members 230 and the plurality of pin members 230 are respectively inserted into the pin insertion grooves 122 defined in the upper surface of the flange 120 such that the flange 120 and the base flange 212 are in close contact with each other, the flange projection regions 124 may face, in the upward/downward direction, the spaces defined by the flange insertion regions 224*a*. The flange projection regions 124 may be defined above the spaces defined by the flange insertion regions 224*a*. This may be understood as a configuration in which, when the pin member 230 is inserted into the pin insertion groove 122, the flange projection region 124 may pass through the flange insertion region 224*a* and be positioned in an upper region of the flange insertion region 224*a*.

The assembly structure 10 according to the present disclosure may include a configuration that prevents the assembling part 100 and the coupling part 200 from separating from each other in the upward/downward direction H when the assembling part 100 and the coupling part 200 are completely coupled. More specifically, according to the present disclosure, the sleeve member 220 and the flange 120 may be configured to interfere with each other in the upward/downward direction H when a rotation angle of the sleeve member 220 with respect to the base member 210 is within a predetermined range.

More specifically, the interference between the flange 120 and the sleeve member 220 in the upward/downward direction H may occur when the sleeve member 220 is rotated after the flange projection region 124 defined on the flange 120 passes through the flange insertion region 224*a* and the flange projection region 124 reaches an upper side of the flange insertion region 224*a*. In other words, when the sleeve member 220 is rotated by a predetermined rotation angle after the flange projection regions 124 pass through the flange insertion regions 224*a* and the flange projection regions 124 reach the upper sides of the flange insertion regions 224*a*, at least a part of a lower region of each of the flange projection regions 124 does not face each of the flange insertion regions 224*a* any further. Also, the flange projection regions 124 face sleeve projection regions 224*b* (see FIGS. 3 and 7) each having a shape that extends in the circumferential direction A from an end of the flange insertion region 224*a* based on the circumferential direction A on the inner peripheral surface of the lower sleeve 224 and that protrudes inward toward the rotation center axis AX. That is to say, the sleeve projection region 224*b* may be defined in a region of the inner peripheral surface of the lower sleeve 224 in which the flange insertion region 224*a* is not defined. The inner peripheral surface of the lower sleeve 224 may have a concave-convex structure in which the flange insertion regions 224*a* and the sleeve projection regions 224*b* are alternately defined in the circumferential direction A.

According to the present disclosure, the interference between the flange projection region 124 and the sleeve projection region 224*b* may prevent the assembling part 100, which includes the flange 120, and the coupling part 200, which includes the lower sleeve 224, from separating from each other in the upward/downward direction H.

As illustrated in FIG. 8, according to the example of the present disclosure, the insertion region 240*a* of the latch member 240 may face the recessed region 214*b* of the base protruding portion 214 in the state in which the sleeve member 220 is rotated relative to the base member 210 so that the interference region 214*a* of the base member 210 is provided adjacent to a boundary of one side of the rotation interference groove 222*a* of the upper sleeve 222 based on the circumferential direction A. In other words, the insertion region 240*a* may be inserted into the recessed region 214*b* in the state in FIG. 8. More particularly, in the state in which the insertion region 240*a* is inserted into the recessed region 214*b*, the boundary of one side of the rotation interference groove 222*a* based on the circumferential direction A may be in contact with the interference region 214*a*.

In contrast, as illustrated in FIG. 9, according to the example of the present disclosure, the insertion region 240*a* of the latch member 240 may be spaced apart from the recessed region 214*b* of the base protruding portion 214 in the circumferential direction A in the state in which the sleeve member 220 is rotated relative to the base member 210 so that the interference region 214*a* of the base member 210 is provided adjacent to a boundary of the other side of the rotation interference groove 222*a* of the upper sleeve 222 based on the circumferential direction A. In this case, when the assembly structure 10 is viewed from above the assembly structure 10 in the state in FIG. 9, the entire flange projection region 124 of the flange 120 may be accommodated in the flange insertion region 224*a* of the lower sleeve 224, as illustrated in FIG. 3. That is to say, the state illustrated in FIG. 9 may correspond to a state in which the flange projection region 124 may pass through the flange insertion region 224*a* during the process in which the assembling part 100 including the flange 120 is coupled to the coupling part 200 including the sleeve member 220. More particularly, the boundary of the other side of the rotation interference groove 222*a* may be in contact with the interference region 214*a* in the state in which the entire flange projection region 124 of the flange 120 is provided to be accommodated in the flange insertion region 224*a* of the lower sleeve 224 when the assembly structure 10 is viewed from above.

According to the present disclosure, in order to more securely couple the base member 210 and the sleeve member 220, the assembly structure 10 may further include another configuration in addition to the latch member 240.

Figure 10:
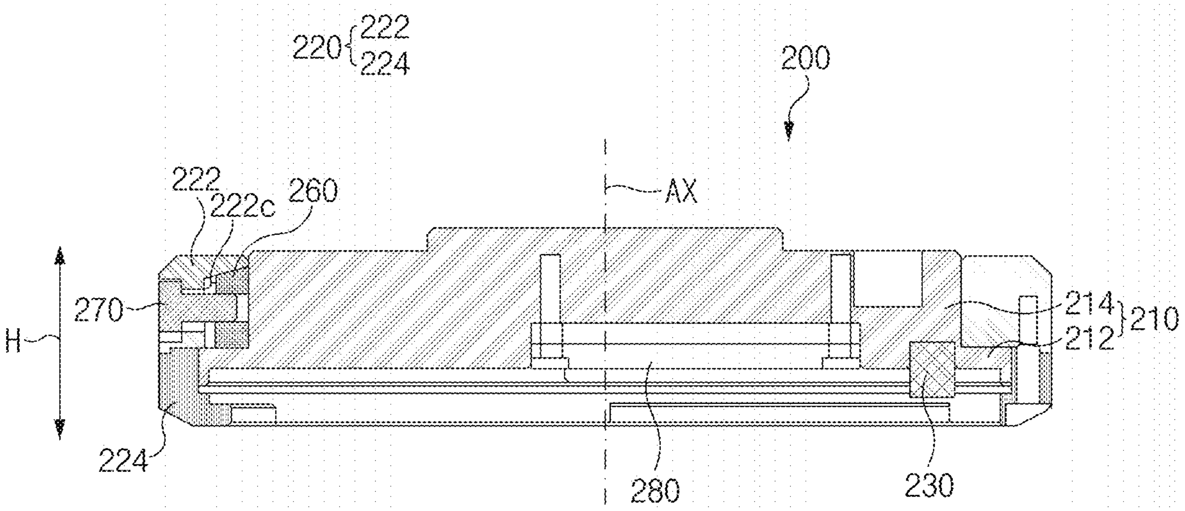
FIG. 10 is a vertical cross-sectional view illustrating a coupling part according to the present disclosure and illustrating a state before a sleeve member is moved upward by a bolt-nut coupling between a bolt member and a sliding member.
Figure 11:
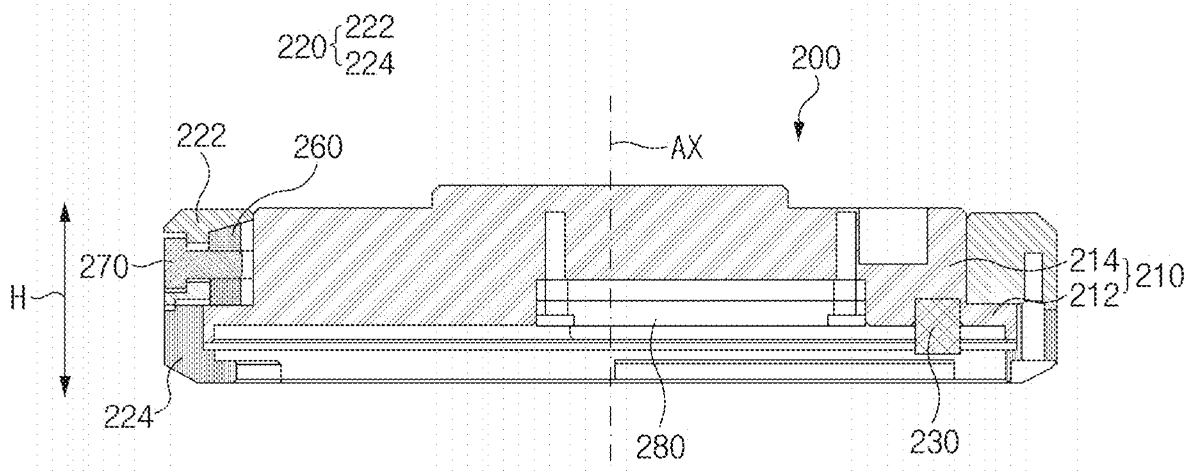
FIG. 11 is a vertical cross-sectional view illustrating the coupling part of FIG. 10 according to the present disclosure and illustrating a state after the sleeve member is moved upward by the bolt-nut coupling between the bolt member and the sliding member.

FIG. 10 is a vertical cross-sectional view illustrating the coupling part according to the present disclosure and illustrating a state before the sleeve member is moved upward by a bolt-nut coupling between a bolt member and a sliding member. FIG. 11 is a vertical cross-sectional view illustrating the coupling part according to the present disclosure and illustrating a state after the sleeve member is moved upward by the bolt-nut coupling between the bolt member and the sliding member.

With reference to FIGS. 10 and 11, the coupling part 200 may further include a sliding member 260 accommodated in the upper sleeve 222 and may further include a bolt member 270 configured to be inserted into an outer peripheral surface of the upper sleeve 222 and the sliding member 260. More specifically, a sliding member coupling groove 222*c* (see FIG. 6) may be defined in a peripheral region of the upper sleeve 222. The sliding member coupling groove 222*c* has a recessed shape and defines a space in which the sliding member 260 is accommodated. The shape and size of the sliding member coupling groove 222*c* may correspond to the shape and size of the sliding member 260.

A coupling force between the base member 210 and the sleeve member 220 may be increased by adjusting a degree to which the sliding member 260 and the bolt member 270 are coupled to each other. As a result, it is possible to implement the increased coupling between the coupling part 200 and the flange 120.

In particular, according to the present disclosure, the upper surface of the flange 120 may be pressed against and provided to be in close contact with the lower surface of the base flange 212 of the coupling part 200 by means of the sliding member 260 and the bolt member 270. Thus, clamping coupling between the coupling part 200 and the flange 120 may be implemented.

In order to achieve the above-mentioned objects, according to the present disclosure, the sleeve member 220 may be moved in the upward/downward direction H relative to the base member 210 by adjusting a degree of the bolt-nut coupling between the sliding member 260 and the bolt member 270. More specifically, with reference to FIGS. 4, 10, and 11, the upper surface of the sliding member 260 may include a shape of an inclined surface having a height, in the upward/downward direction H, that decreases in the direction away from the rotation center axis AX, i.e., in the radial direction. The region of the sliding member coupling groove 222*c*, which faces the upper surface of the sliding member 260, may include a shape corresponding to the inclined surface defined on the upper surface of the sliding member 260. For example, the entire upper surface of the sliding member 260 may have a shape of an inclined surface.

Because the upper surface of the sliding member 260 has the inclined surface and the sliding member coupling groove 222*c* has the shape corresponding to the inclined surface, the sleeve member 220 may be moved in the upward/downward direction H relative to the base member 210 by interference between the sliding member 260 and the sliding member coupling groove 222*c*.

With reference to FIGS. 10 and 11, when the bolt member 270 rotates and the bolt-nut coupling between the bolt member 270 and the sliding member 260 is adjusted, a relative horizontal position between the bolt member 270 and the sliding member 260 varies. In this case, because the bolt member 270 penetrates the upper sleeve 222 and is coupled to the sliding member 260, a horizontal movement of the bolt member 270 is restricted by a lateral surface of the upper sleeve 222, but the sliding member 260 moves in the horizontal direction. In order to allow the horizontal movement of the sliding member 260, a horizontal width of the internal space defined by the sliding member coupling groove 222*c* may be larger than a horizontal width of the sliding member 260.

Therefore, when the sliding member 260 moves in the horizontal direction, the sleeve member 220, which includes the upper sleeve 222 that accommodates the sliding member 260, is moved in the upward/downward direction relative to the base member 210 by interference between the inclined surface, which is defined on the upper surface of the sliding member 260, and the sliding member coupling groove 222*c* that faces the inclined surface.

For example, when the bolt member 270 rotates and the sliding member 260 moves toward the rotation center axis AX, the sleeve member 220 is moved downward relative to the base member 210 (before clamping coupling), as illustrated in FIG. 10. In contrast, when the bolt member 270 rotates and the sliding member 260 moves in the direction away from the rotation center axis AX, the sleeve member 220 is moved upward relative to the base member 210 (clamping coupling), as illustrated in FIG. 11.

In order to provide a route along which the sleeve member 220 may be moved in the upward/downward direction H by the rotation of the bolt member 270, a size in the upward/downward direction H of a hole defined in a region of the upper sleeve 222 into which the bolt member 270 is inserted may be larger than a size in the upward/downward direction H of a region of the bolt member 270 inserted into the upper sleeve 222. In addition, a size in the upward/downward direction H of a hole defined in a region of the sliding member 260 into which the bolt member 270 is inserted may correspond to a size in the upward/downward direction H of a region of the bolt member 270 inserted into the sliding member 260. As illustrated in FIGS. 10 and 11, according to the example of the present disclosure, a lower surface of the sliding member 260 may be provided to be in close contact with an upper surface of the base flange 212. The lower surface of the sliding member 260 may be perpendicular to the rotation center axis AX. In other words, the lower surface of the sliding member 260 may include no inclined surface.

In contrast, unlike the configuration illustrated in FIGS. 10 and 11, the inclined surface defined on the sliding member 260 may be defined on the lower surface of the sliding member 260. That is, according to another example of the present disclosure, the lower surface of the sliding member 260 may include a shape of an inclined surface having a height, in the upward/downward direction H, that increases in the direction away from the rotation center axis AX. The lower surface of the sliding member 260 may be provided to be in close contact with the upper surface of the base flange 212. In this case, a region of the upper surface of the base flange 212, which faces the lower surface of the sliding member 260, may include a shape corresponding to the inclined surface defined on the lower surface of the sliding member 260. In addition, the upper surface of the sliding member 260 may be provided to be in close contact with the sliding member coupling groove 222*c*. The upper surface of the sliding member 260 may be perpendicular to the rotation center axis AX. In a similar principle to the case in which the inclined surface is defined on the upper surface of the sliding member 260, the relative movement between the sleeve member 220 and the base member 210 may be performed in the upward/downward direction H even in the case in which the inclined surface is defined on the lower surface of the sliding member 260.

The assembly structure 10 according to the present disclosure may further include a configuration that electrically connects the assembling part 100 and the coupling part 200.

Figure 12:
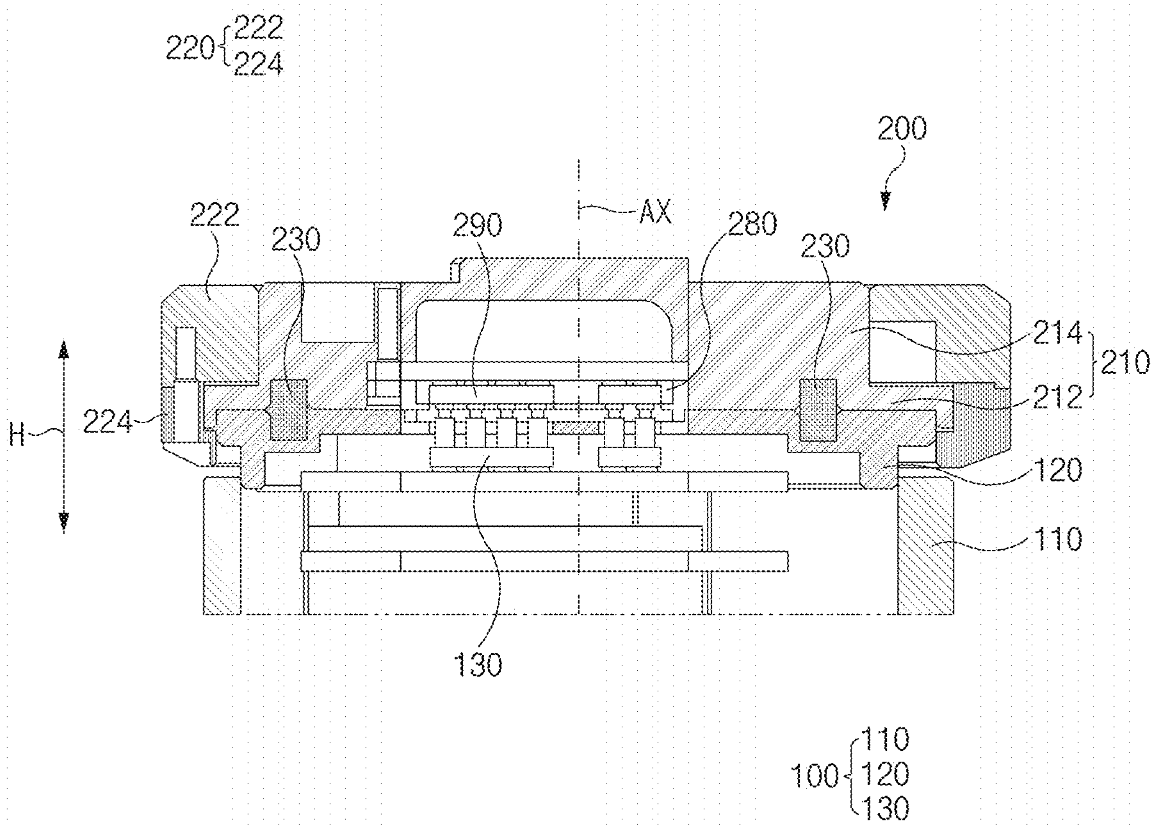
FIG. 12 is a vertical cross-sectional view illustrating an assembly structure according to the present disclosure and illustrating a state after an assembling part and a coupling part are completely coupled.

FIG. 12 is a vertical cross-sectional view illustrating the assembly structure according to the present disclosure and illustrating a state after the assembling part and the coupling part are completely coupled.

With reference to FIGS. 4 and 12, the coupling part 200 may include a connector cover 280 accommodated in a lower surface of the base flange 212 and may include a coupling part connector 290 provided between the connector cover 280 and a region of the lower surface of the base flange 212 that accommodates the connector cover 280. In addition, the assembling part 100 may include an assembling part connector 130 accommodated in the internal space of the assembling part 100. In this case, the assembling part connector 130 may penetrate the connector cover 280 and be inserted and coupled into the coupling part connector 290. In particular, in the case of the structure of the assembly structure 10 according to the present disclosure, the connector structures with various shapes including a plug-socket type connector structure may be applied to the assembly structure 10.

The present disclosure has been described with reference to various embodiments and the drawings, but the present disclosure is not limited thereby. The present disclosure may be carried out in various forms by those of ordinary skill in the art, to which the present disclosure pertains, within the technical spirit of the present disclosure and the scope of the appended claims.

What is claimed is:

1. An assembly structure comprising:
an assembling part; and
a coupling part provided above the assembling part and configured to be attachable to or detachable from the assembling part,
wherein the assembling part includes
a body configured to define a body of the assembling part and open at an upper side thereof, and
a flange fixedly coupled to an upper portion of the body,
wherein the coupling part includes
a base member; and
a sleeve member configured to surround a periphery of the base member and opened at a lower side thereof,
wherein the flange is configured to penetrate the sleeve member and face the base member,
wherein a rotational motion of the flange is restricted about a rotation center axis of the assembly structure relative to the base member,
wherein the sleeve member is configured to rotate relative to the base member, and
wherein the sleeve member and the flange are configured to interfere with each other in an upward/downward direction when a rotation angle of the sleeve member with respect to the base member is within a predetermined range.

2. The assembly structure of claim 1, wherein:
the coupling part further comprises a pin member protruding downward from a lower surface of the base member;
a pin insertion groove is defined in an upper surface of the flange and has a shape that is recessed downward; and
the pin member is inserted into the pin insertion groove.

3. The assembly structure of claim 2, wherein the base member comprises:
a base flange to which the pin member is coupled; and
a base protruding portion protruding upward from the base flange,
wherein an interference region is defined on an outer peripheral surface of the base protruding portion and has a shape protruding outward,
wherein the sleeve member includes an upper sleeve configured to define an upper region of the sleeve member and to surround the outer peripheral surface of the base protruding portion,
wherein the upper sleeve has a rotation interference groove defined in an inner peripheral surface of the upper sleeve and configured to accommodate the interference region, and wherein the interference region is configured to interfere with the upper sleeve at a boundary of the rotation interference groove based on a circumferential direction.

4. The assembly structure of claim 3, wherein:

a recessed region is defined in the outer peripheral surface of the base protruding portion and is spaced apart from the interference region in the circumferential direction;

the recessed region has a shape recessed inward; and the coupling part further comprises a latch member that is rotatably coupled to the upper sleeve and that has at least a partial region configured to be inserted into the recessed region in a state in which the sleeve member is coupled to the base member so that the interference region is placed in the rotation interference groove.

5. The assembly structure of claim 4, wherein:

the latch member comprises an insertion region having a shape protruding toward the rotation center axis (AX) so as to be inserted into the recessed region; and the insertion region faces the recessed region in a state in which the sleeve member is rotated relative to the base member so that the interference region is provided adjacent to a boundary of one side of the rotation interference groove based on the circumferential direction.

6. The assembly structure of claim 5, wherein:

the upper sleeve has a latch accommodation groove that is configured to accommodate the latch member and that has a shape that is recessed in the upward/downward direction;

a latch rotation shaft penetrates the latch member in the upward/downward direction (H); and the coupling part further comprises an elastic member configured to face the insertion region with the latch rotation shaft interposed therebetween, and the elastic member is provided between the latch member and the outer peripheral surface of the base protruding portion.

7. The assembly structure of claim 6, wherein an outer surface of a region of the latch member, which faces the elastic member, is exposed to the outside.

8. The assembly structure of claim 3, wherein:

the sleeve member further comprises a lower sleeve provided below the upper sleeve, configured to surround an outer peripheral surface of the base flange, and fixedly coupled to the upper sleeve;

the lower sleeve has a flange insertion region that is defined in a part of an inner peripheral surface of the lower sleeve and that has a shape that is recessed outward;

the flange has a flange projection region that protrudes outward from the outer peripheral surface of the flange; and a width of the flange insertion region in the circumferential direction of the assembly structure is larger than a width of the flange projection region in the circumferential direction or corresponds to the width of the flange projection region.

9. The assembly structure of claim 8, wherein, when the assembly structure is viewed from above the assembly structure, the entire flange projection region is accommodated in the flange insertion region in a state in which the sleeve member is rotated relative to the base member so that the interference region is provided adjacent to a boundary of another side of the rotation interference groove based on the circumferential direction.

10. The assembly structure of claim 3, wherein the coupling part comprises:

a sliding member accommodated in the upper sleeve; and a bolt member configured to be inserted into an outer peripheral surface of the upper sleeve and the sliding member, wherein a sliding member coupling groove is defined in a peripheral region of the upper sleeve, and wherein the sliding member coupling groove has a recessed shape and defines a space that accommodates the sliding member.

11. The assembly structure of claim 10, wherein:

a size in the upward/downward direction of a hole defined in a region of the upper sleeve into which the bolt member is inserted is larger than a size in the upward/downward direction of a region of the bolt member inserted into the upper sleeve; and a size in the upward/downward direction (H) of a hole defined in a region of the sliding member into which the bolt member is inserted corresponds to a size in the upward/downward direction of a region of the bolt member inserted into the sliding member.

12. The assembly structure of claim 10, wherein:

an upper surface of the sliding member includes a shape of an inclined surface having a height, in the upward/downward direction, that decreases in a direction away from the rotation center axis; and a region of the sliding member coupling groove, which faces the upper surface of the sliding member, includes a shape corresponding to the inclined surface defined on the upper surface of the sliding member.

13. The assembly structure of claim 12, wherein a lower surface of the sliding member is provided to be in close contact with an upper surface of the base flange, and wherein the lower surface of the sliding member is perpendicular to the rotation center axis.

14. The assembly structure of claim 10, wherein:

a lower surface of the sliding member includes a shape of an inclined surface having a height, in the upward/downward direction, that increases in a direction away from the rotation center axis;

the lower surface of the sliding member is provided to be in close contact with an upper surface of the base flange; and a region of the upper surface of the base flange, which faces the lower surface of the sliding member, includes a shape corresponding to the inclined surface defined on the lower surface of the sliding member.

15. The assembly structure of claim 14, wherein an upper surface of the sliding member is provided to be in close contact with the sliding member coupling groove, and wherein the upper surface of the sliding member is perpendicular to the rotation center axis (AX).

16. The assembly structure of claim 3, wherein the coupling part further comprises:

a connector cover accommodated in a lower surface of the base flange; and a coupling part connector provided between the connector cover and a region of a lower surface of the base flange that accommodates the connector cover.

17. The assembly structure of claim 16, wherein:

the assembling part further comprises an assembling part connector accommodated in an internal space of the assembling part; and the assembling part connector penetrates the connector cover and is inserted and coupled into the coupling part connector.

18. A robot comprising the assembly structure according to claim 1, wherein the coupling part is coupled to a robot arm provided on the robot, and wherein the assembling part is coupled to a gripper coupled to one side of the robot arm and configured to perform a gripping function.

* * * * *